Feb. 14, 1928.
C. W. GLADDING
TRUCK
Filed Feb. 11, 1927
1,658,893
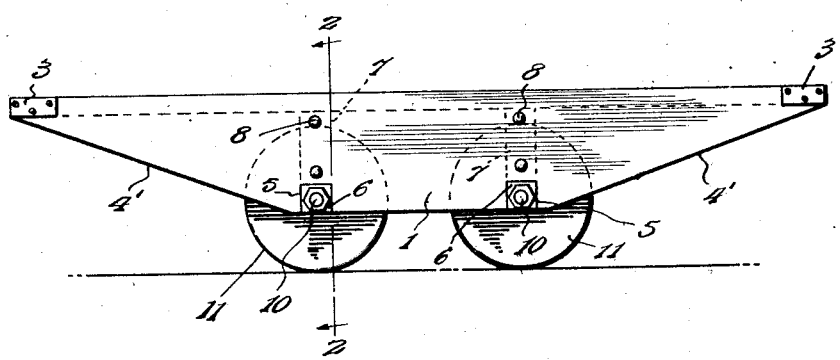
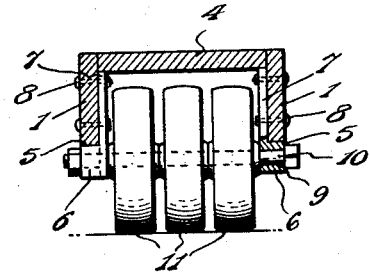
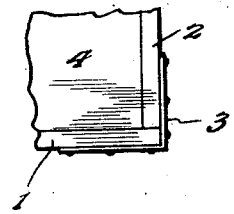
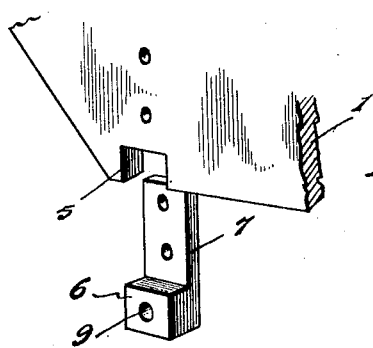
Inventor
C. W. Gladding.
By Lacey & Lacey, Attorneys Patented Feb. 14, 1928.

1,658,893

UNITED STATES PATENT OFFICE.

CHARLES W. GLADDING, OF NEWPORT, RHODE ISLAND.

TRUCK.

Application filed February 11, 1927. Serial No. 167,512.

The present invention is directed to improvements in trucks.

The primary object of the invention is to provide a device of this character more particularly designed for conveying radiators to their place of connection in dwellings.

Another object of the invention is to provide a device of this kind so constructed that it can be easily manipulated to pass over obstructions without the necessity of removing the radiators from the truck.

Another object of the invention is to provide a device of this type wherein the wheels thereof are so arranged that they will not mar the floor when the device is passing thereover.

In the accompanying drawing:

Figure 1 is a side elevation of the truck.
Figure 2 is a sectional view on line 2—2 of Figure 1.
Figure 3 is a fragmentary top plan view.
Figure 4 is a detail perspective view of the bearing blocks and sills.

The truck comprises a pair of side sills 1, held in spaced parallel relation by end bars 2, angle iron plates 3 being provided to hold the meeting ends of said sills and end bars firmly united.

The top 4 is suitably fixed to the sills 1, said sills having beveled lower edges 4'. At points between the beveled edges 4' each sill 1 is formed with a pair of downwardly opening recesses 5 and in which the blocks 6 snugly fit, and these blocks have arms 7 formed upon their inner ends which rest upon the inner surface of the sills and are secured thereto by clamping bolts 8 which maintain the blocks firmly in the recesses 5. The blocks are provided with bearings 9 for rotatably supporting the ends of the axles 10. Each axle has rotatably mounted thereon fiber wheels 11, preferably three in number, said wheels having comparatively wide treads in order to prevent marring of the floor when the truck is drawn thereover.

By providing the beveled edges 4' the truck can be tilted from either end so as to permit the same to be stepped over obstructions, the axles 10 being spaced sufficiently to permit this to be readily accomplished. By providing each axle with three wheels the truck can be run upon a comparatively narrow skid without danger of tilting sideways.

While I have described the truck as being particularly designed for use for transporting radiators, it will be of course understood that the same can be used for transporting castings or other heavy articles, and when thus used steel wheels may be substituted for the fiber ones.

Having thus described the invention, I claim:

1. A truck comprising side sills having recesses therein, blocks engaged in the recesses and having arms carried thereby for attachment to the sills, said blocks having bearings therein, axles rotatable in the bearings, and wheels rotatable on the axles.

2. A truck comprising side sills having spaced recesses in their lower edges, blocks engaged in the recesses, arms carried by the blocks for attachment to the side sills, axles rotatable in the bearings, a plurality of wheels mounted on each axle, said side sills being beveled for a certain distance of their length, as and for the purpose set forth.

In testimony whereof I affix my signature.

CHARLES W. GLADDING. [L. S.]